(12) United States Patent
Okamoto (10) Patent No.: US 6,907,141 B1
(45) Date of Patent: Jun. 14, 2005

(54) IMAGE DATA SORTING DEVICE AND IMAGE DATA SORTING METHOD

(75) Inventor: Hitoshi Okamoto, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 681 days.

(21) Appl. No.: 09/716,445

(22) Filed: Nov. 21, 2000

(30) Foreign Application Priority Data

Mar. 14, 2000 (JP) ........................................ 2000-070761

(51) Int. Cl.[7] .............................................. G06K 9/62
(52) U.S. Cl. ........................................ 382/225; 707/7
(58) Field of Search ................................ 382/225, 224, 382/218, 162, 165, 305; 707/104.1, 7

(56) References Cited

U.S. PATENT DOCUMENTS

| | | | | |
|---|---|---|---|---|
| 5,161,204 | A | * | 11/1992 | Hutcheson et al. ......... 382/157 |
| 6,072,904 | A | * | 6/2000 | Desai et al. ................. 382/225 |
| 6,104,835 | A | * | 8/2000 | Han ............................ 382/225 |
| 6,173,275 | B1 | * | 1/2001 | Caid et al. ..................... 706/14 |
| 6,233,367 | B1 | * | 5/2001 | Craver et al. ............... 382/305 |
| 6,240,424 | B1 | * | 5/2001 | Hirata ...................... 707/104.1 |
| 6,298,174 | B1 | * | 10/2001 | Lantrip et al. .............. 382/305 |
| 6,345,274 | B1 | * | 2/2002 | Zhu et al. ....................... 707/5 |
| 6,393,427 | B1 | * | 5/2002 | Vu et al. ..................... 707/101 |
| 6,430,307 | B1 | * | 8/2002 | Souma et al. ............... 382/118 |
| 6,512,850 | B2 | * | 1/2003 | Yaung ........................ 382/225 |
| 6,574,378 | B1 | * | 6/2003 | Lim ............................ 382/305 |

FOREIGN PATENT DOCUMENTS

| | | |
|---|---|---|
| JP | Hei 7-160844 | 6/1995 |
| JP | Hei 8-249467 | 9/1996 |
| JP | Hei 9-138804 | 5/1997 |
| JP | Hei 10-198683 | 7/1998 |
| JP | Hei 11-203461 | 7/1999 |
| JP | Hei 2000-76281 | 3/2000 |

OTHER PUBLICATIONS

Minka et al, Interactive Learning with a "Society of Models", Proceedings of the 1996 IEEE Computer Society Conference on Computer Vision and Pattern Recognition, Jun. 18–20, 1996, p. 447–452.*

Ma et al, NeTra: A Toolbox for Navigating Large Image Databases, Proceedings of the International Conference on Image Processing, Oct. 26–29, 1997, vol. 1, p 568–571.*

English Abstract and Machine Translation of Japanese Publication JP 11-136573, May 21, 1999.*

Machine Translation of JP-11136573 (Takashi et al), May 21, 1999.*

* cited by examiner

Primary Examiner—Yon J. Couso
(74) Attorney, Agent, or Firm—Morgan Lewis & Bockius LLP

(57) ABSTRACT

The image data sorting device is configured with a characteristic value extraction unit that extracts from an image data piece a characteristic value of the image data piece; a relation evaluation unit that evaluates a mutual relation between the characteristic values extracted from plural image data pieces; a clustering unit that executes clustering to events expressed by the characteristic values of the plural image data pieces on the basis of the evaluation result of the above relation; and a sorting register unit that sorts the plural image data pieces on the basis of the result of the above clustering. The image data sorting device with the above configuration can provide a user with facility of use, whereby the appropriateness of the sorting can be secured without requiring any preprocessing, etc., and automatic sorting of the image data pieces can be carried out independently of the types of the image data pieces.

22 Claims, 6 Drawing Sheets

IMAGE DATA SORTING DEVICE AND IMAGE DATA SORTING METHOD

BACKGROUND OF THE INVENTION

1. Field of the Invention

The present invention relates to an image data sorting device and a method of the same that sort image data pieces, especially, digital data pieces of static color images.

2. Description of the Related Art

Many database servers and file servers having a function to store image data pieces achieve efficiency in the management and retrieval of the image data pieces, etc., by sorting the image data pieces into several groups.

In the conventional major method of sorting image data pieces, cord information such as a key word is added to each of the image data pieces. This is because the addition of cord information exceedingly facilitates the management and the retrieval of the image data pieces by using the cord information as the key. However, in the addition of the cord information to the image data pieces, grouping and storing the image data pieces, or retrieving and fetching the image data pieces requires inputting the cord information through a keyboard or the like that necessarily accompanies considerable labor, which is a disadvantage.

From this view, several methods of sorting image data pieces without needing the addition of the cord information have been proposed in recent years. For example, Japanese Published Unexamined Patent Application No. Hei 7-160844 has disclosed a filing device that sorts image data pieces by judging a similarity between the image data pieces on the basis of characteristic values of the image data pieces. Such a filing device calculates the characteristic values of the image data pieces newly inputted, reads the characteristic values of the image data pieces that have already been stored and grouped, calculates the similarities between the calculated characteristic values and the characteristic values read out to acquire the maximum value thereof, and judges that the inputted image data pieces belong to the group that gives the maximum similarity.

Also, Japanese Published Unexamined Patent Application No. Hei 10-198683 has disclosed a sorting method that executes character recognition processing to image data pieces and sorts the image data by judging a similarity between the image data pieces. Such a sorting method executes the character recognition processing to image data pieces newly inputted, calculates the similarities on the basis of the characteristics of character types by the recognition processing and the total number of the characters to acquire the maximum value thereof, and judges that the inputted image data pieces belong to the group that gives the maximum similarity. Further, among each of the groups, the method selects a representative image data piece that best illustrates the characteristics of the group.

However, there is a possibility of causing the following problems in the conventional image data sorting methods mentioned above. In case of the filing device disclosed in Japanese Published Unexamined Patent Application No. Hei 7-160844, since sorting is executed based on whether or not the image data pieces belong to the sorting (grouping) items that have already existed, if the range of the sorting items that have already existed is not appropriate, preferable sorting will not be executed, leading to a possible result that sorting of the image data pieces is inappropriate.

In contrast to this, the sorting method disclosed in Japanese Published Unexamined Patent Application No. Hei 10-198683 sets the representative image data piece that best illustrate the characteristics of the sorting items each and registers these in advance, thereby enhancing the appropriateness of the sorting items. However, this sorting method executes sorting on the basis of the characteristics of character types processed by the character recognition processing, etc., and the method cannot sort natural image data pieces and the like where characters do not exist, accordingly.

Further, in any case of the above two (the filing device of Japanese Published Unexamined Patent Application No. Hei 7-160844, and the sorting method of Japanese Published Unexamined Patent Application No. Hei 10-198683), in order to secure the appropriateness of the range of the sorting items, the following will become indispensable: the preparatory processing such as setting the representative image data pieces that best illustrate the characteristics of the sorting items and the like, and the maintenance work such as dividing the item, etc., in case of the number of registering to a certain sorting item becoming too large.

SUMMARY OF THE INVENTION

Accordingly, the present invention has been made in view of the foregoing circumstances, and provides an image data sorting device and the method of the same that secures the appropriateness of the range (grouping) of the sorting items in the sorting of the image data pieces, without needing the preparatory processing and the maintenance work, etc., and executes the sorting regardless of the types of the image data pieces (document image data pieces, natural image data pieces, etc.).

An image data sorting device according to one aspect of the invention includes: a characteristic value extraction unit that extracts a characteristic value of an image data piece from the image data piece; a relation evaluation unit that evaluates a mutual relation between the characteristic values that the characteristic value extraction unit extracts from plural image data pieces; a clustering unit that executes clustering to events expressed by the characteristic values of the plural image data pieces on the basis of an evaluation result of the relation acquired by the relation evaluation unit; and a sorting register unit that sorts the plural image data pieces on the basis of a result of clustering by the clustering unit.

Further, an image data sorting method according to another aspect of the invention includes the steps of: extracting a characteristic value of an image data piece from the image data piece; when extracting characteristic values from plural image data pieces, evaluating a mutual relation between the characteristic values each; executing clustering to events expressed by the characteristic values of the plural image data pieces on the basis of an evaluation result of the relation; and sorting the plural image data pieces on the basis of a result of the clustering.

According to the image data sorting device and the image data sorting method provided with the above steps, when characteristic values are extracted from plural image data pieces, a mutual relation is evaluated as to each of the characteristic values, and thereafter, on the basis of an evaluation result thereof, clustering is executed which sorts events expressed by the characteristic values of the plural image data pieces into several clusters. Here, the clustering signifies sorting that is automatically performed without externally given criteria, that is, the so-called 'unsupervised automatic classification'. In clustering, a measure representing a relation between arbitrary two data pieces is assumed as defined in a set of data pieces to be sorted, and the set of data pieces is divided into several clusters; and grouping is carried out in such a manner that the relation between the data pieces in each cluster becomes higher and the relation between the data pieces in different clusters becomes lower. Therefore, provided that sorting is based on the clustering result, the image data pieces are to be sorted in such a manner that the image data pieces each having a higher relation belong to one cluster without any preprocessing for setting external criteria, etc., required. Further, the sorting is based on the result of the clustering executed to the characteristic values of the image data pieces, and the result of the sorting will not be dependent on the types of the image data pieces such as document images or natural images, etc., accordingly.

BRIEF DESCRIPTION OF THE DRAWINGS

Preferred embodiments of the present invention will be described in detail based on the followings, wherein.

DETAILED DESCRIPTION OF THE PREFERRED EMBODIMENTS

The device and method of sorting image data pieces relating to the invention will be described with reference to the accompanying drawings. Here, the invention is applied to a filing device of image data pieces as an example.

[First Embodiment]

Figure 1:
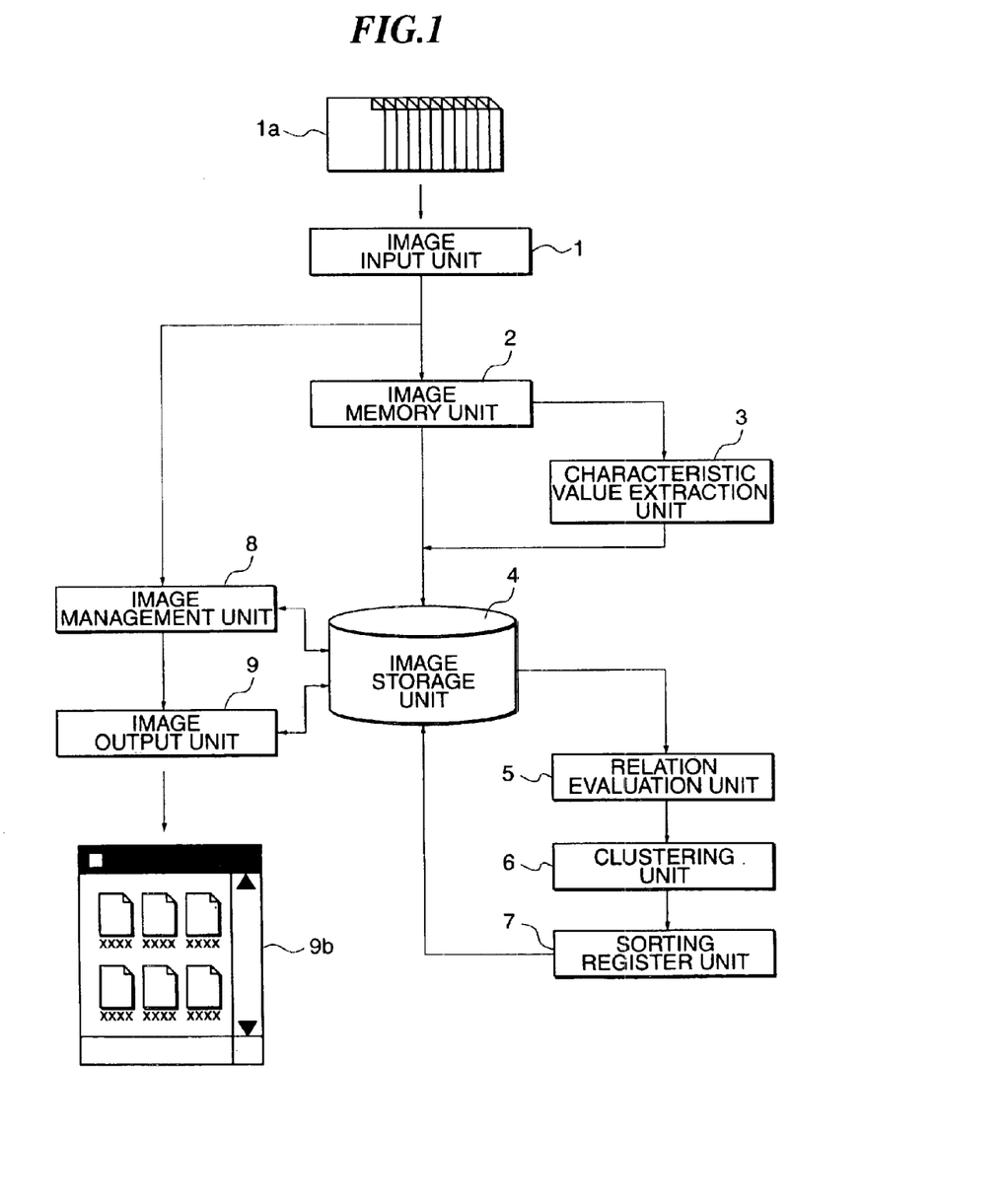
FIG. 1 is a block diagram illustrating a schematic configuration in the first embodiment of the image data sorting device relating to the invention.

First, a schematic configuration of the filing device in this embodiment will be explained. FIG. 1 is a block diagram illustrating a first schematic configuration in which the invention is applied to the filing device.

As illustrated in FIG. 1, the filing device in this embodiment includes an image input unit 1, an image memory unit 2, a characteristic value extraction unit 3, an image storage unit 4, a relation evaluation unit 5, a clustering unit 6, a sorting register unit 7, an image management unit 8, and an image output unit 9.

The image input unit 1 is to acquire an image data piece from an input image 1a and input it to the filing device as the image data to be registered. The input image 1a includes, for example, documents printed on a paper, image files photographed by a digital camera, or document files prepared by application software. Also, it is conceivable that the image input unit 1 can be realized, for example, by a scanner and its control unit, a read/write device for a magnetic disk or a memory card or the like and its control unit, a data transfer device that sends and receives data pieces through a network, etc., or a unit that rasterizes a document file prepared by application software into a bitmap image.

Further, accompanied with the input of the image data piece, the image input unit 1 may input attribute information relating to the image data piece. The attribute information includes the file name, data size, creation data, type of data format, etc., of the image data piece.

The image memory unit 2 is to temporarily hold and memorize the image data piece taken in by the image input unit 1. Accordingly, the image memory unit 2 is implemented by a semiconductor memory or a hard disk drive, etc. When memorizing a document file prepared by application software and the like, the image memory unit 2 may memorize the document file in association with the bitmap image after the file is expanded.

The characteristic value extraction unit 3 is to extract the characteristic values of the image data pieces from the image data pieces temporarily memorized by the image memory unit 2, such as a color tone of the whole image, an aspect ratio, a distribution state of brilliance and color, a distribution state of edges, a distribution state of flat areas, and the like. Here, the characteristic value extraction unit 3 is to extract n types of the characteristic values expressed by the Ij dimensional vector (j=1, 2, . . . , n, here, $1 \leq Ij$, $1 \leq n$, n: integer) per each image data piece. Concretely, it is conceivable to convert an image data piece into a color space L*a*b* of the brilliance/chrominance system, and thereafter reduce each of the image data pieces on the color planes into m×m pixels, express a pixel value obtained by the reduction as a $m^2$ dimensional vector, and extract the $m^2$ dimensional vector thus acquired as the characteristic value.

The image storage unit 4 is to receive an image data piece temporarily memorized by the image memory unit 2 from the image memory unit 2 and store the image data piece in association with n types of the characteristic values extracted by the characteristic value extraction unit 3. Accordingly, the image storage unit 4 is implemented by a mass storage device such as a hard disk drive, DVD-RAM (Digital Video Disc-Random Access Memory) drive, or the like.

The relation evaluation unit 5, when there are plural characteristic values that are extracted by the characteristic value extraction unit 3 and are stored in the image storage unit 4 together with the image data pieces, is to compare the characteristic values and calculate the relation between the characteristic values each. The relation here is defined as follows. For example, when the characteristic value is given by a vector expression (hereunder, this characteristic value is referred to as 'characteristic value vector'), distances and angles between the characteristic value vectors associated with each of the image data pieces are calculated, and as the sum of the distances and the angles is small, the relation is evaluated as high. Here, it is conceivable to apply specified weighting to the distances between the characteristic value vectors each in consideration of the angles between the characteristic value vectors each. It is also conceivable to apply specific weighting to n types of the evaluation results, for example, to regard as the 'failure value' the result in which the relation is evaluated as the highest and the result in which the relation is evaluated as the lowest of n types of the evaluation results, and to apply the weighting '0' to them, namely, exclude them from the evaluation.

The clustering unit 6 is to execute clustering of events expressed by singular or plural characteristic values extracted by the characteristic value extraction unit 3, stored together with the image data pieces in the image storage unit 4, on the basis of the evaluation result of the relation acquired by the relation evaluation unit 5. As the events expressed by singular or plural characteristic values, there are degrees of a color tone of the whole image, an aspect ratio, a distribution state of brilliance and color, a distribution state of edges, and a distribution state of flat areas, etc.

Figure 2:
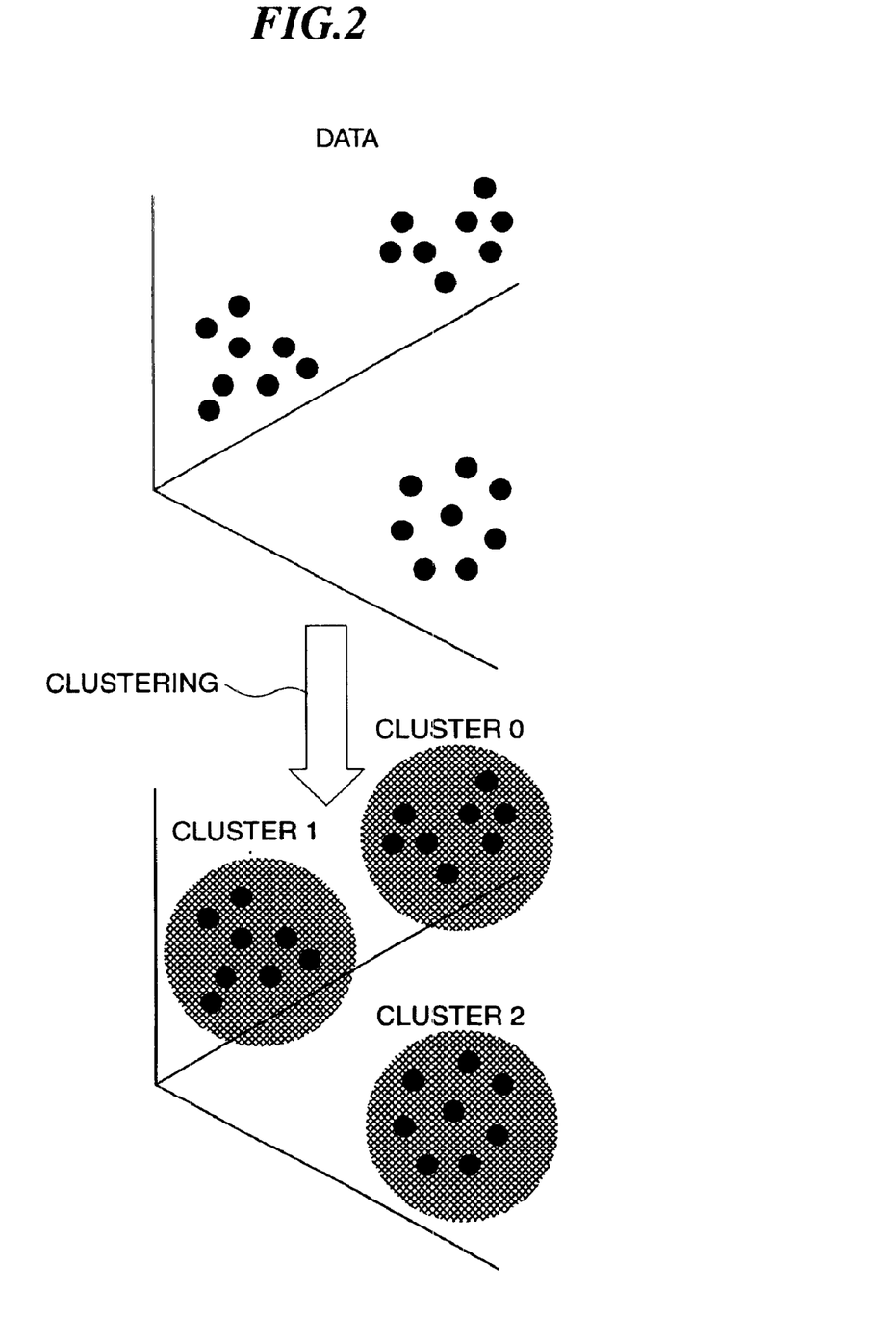
FIG. 2 is a conceptual illustration explaining clustering.

Now, the clustering will be explained briefly. FIG. 2 is a conceptual illustration explaining the clustering.

The clustering signifies a sorting that is automatically performed without externally given criteria, that is, the so-called 'unsupervised automatic classification'. In the clustering as shown in FIG. 2, a measure representing a relation between arbitrary two data pieces is assumed as defined in a set of data pieces to be sorted, and the set of data pieces is divided into several clusters; and grouping is carried out in such a manner that the relation between the data pieces in each clusters becomes higher and the relation between the data pieces in different clusters becomes lower.

As a concrete technique of the clustering, the cluster analysis technique described, for example, in the "Cluster Bunseki Nyumon" (written by Sadaaki Miyamoto, published by Morikita publishing company, 1999) can be a reference. A brief explanation on this clustering technique is as follows. When broadly classifying the clustering technique, there are non-hierarchical clustering and hierarchical clustering. The non-hierarchical clustering signifies that clustering is carried out by means of non-hierarchical method based on the number of clusters. The hierarchical clustering, on the other hand, signifies that clustering is carried out by means of hierarchical method that combines clusters on the basis of the relation (distance) between the clusters. Therefore, there is a difference that in the hierarchical clustering, the clusters are generated in such a manner that groups form nests whereas in the non-hierarchical clustering, groups are only generated. Here, the non-hierarchical clustering needs to know the number of clusters in advance. However, if that is not known, the final cluster is needed to be obtained by setting a number slightly greater than the number to carry out clustering, and thereafter merging clusters closer in distance.

Further, apart from the non-hierarchical clustering and the hierarchical clustering, the clustering technique is divided broadly into a fuzzy technique that applies the fuzzy theory and a crisp technique that does not apply the fuzzy theory. There is a difference between the fuzzy technique and the crisp technique in that the fuzzy technique defines the boundary between the clusters vaguely in accordance with the fuzzy theory whereas the crisp technique defines the boundary between the clusters clearly.

In consequence, the techniques of the clustering are classified into four, from distinction of the non-hierarchical clustering and the hierarchical clustering, and from distinction of the fuzzy technique and the crisp technique. A typical clustering by the non-hierarchical fuzzy technique includes the fuzzy-C average method, typical clustering by the hierarchical fizzy technique includes the transitive closure, typical clustering by the non-hierarchical crisp technique includes the crisp-C average method, and typical clustering by the hierarchical crisp technique includes the agglomerative hierarchical method.

The clustering unit 6 may be the one to execute a clustering by using any of the techniques.

And in FIG. 1, the sorting register unit 7 sorts the image data pieces stored in the image storage unit 4 on the basis of the clustering result by the clustering unit 6, and registers the sorting result in the image storage unit 4. Here, the sorting result by the sorting register unit 7 is assumed to be registered in the image storage unit 4 in association with the attribute information of each image data piece.

The image management unit 8 is to manage the input/output, etc., of the image data pieces stored in the image storage unit 4, on the basis of the sorting result by the sorting register unit 7 and the attribute information of the image data pieces each associated therewith.

The image output unit 9 is to output the image data pieces in accordance with a specified format, that the image management unit 8 instructs to output. In order to perform this, the image output unit 9 is implemented, for example, by a CRT (Cathode Ray Tube) and a control unit thereof, a printer and a control unit thereof, a read/write device of a magnetic disk or a memory card or the like and a control unit thereof, or a data transfer device that transmits and receives data pieces through a network or the like. That is, the image output unit 9 outputs, for example, a document printed on a paper, or an image file outputted on the CRT, or an image file reshaped by the HTML (Hyper Text Markup Language), etc., as an output result 9a.

Of these units, the characteristic value extraction unit 3, the relation evaluation unit 5, the clustering unit 6, the sorting register unit 7, and the image management unit 8 can be implemented, for example, by the combination of a CPU (Central Processing Unit) that executes a specific program and a RAM that functions as a work memory, and the like.

Figure 3:
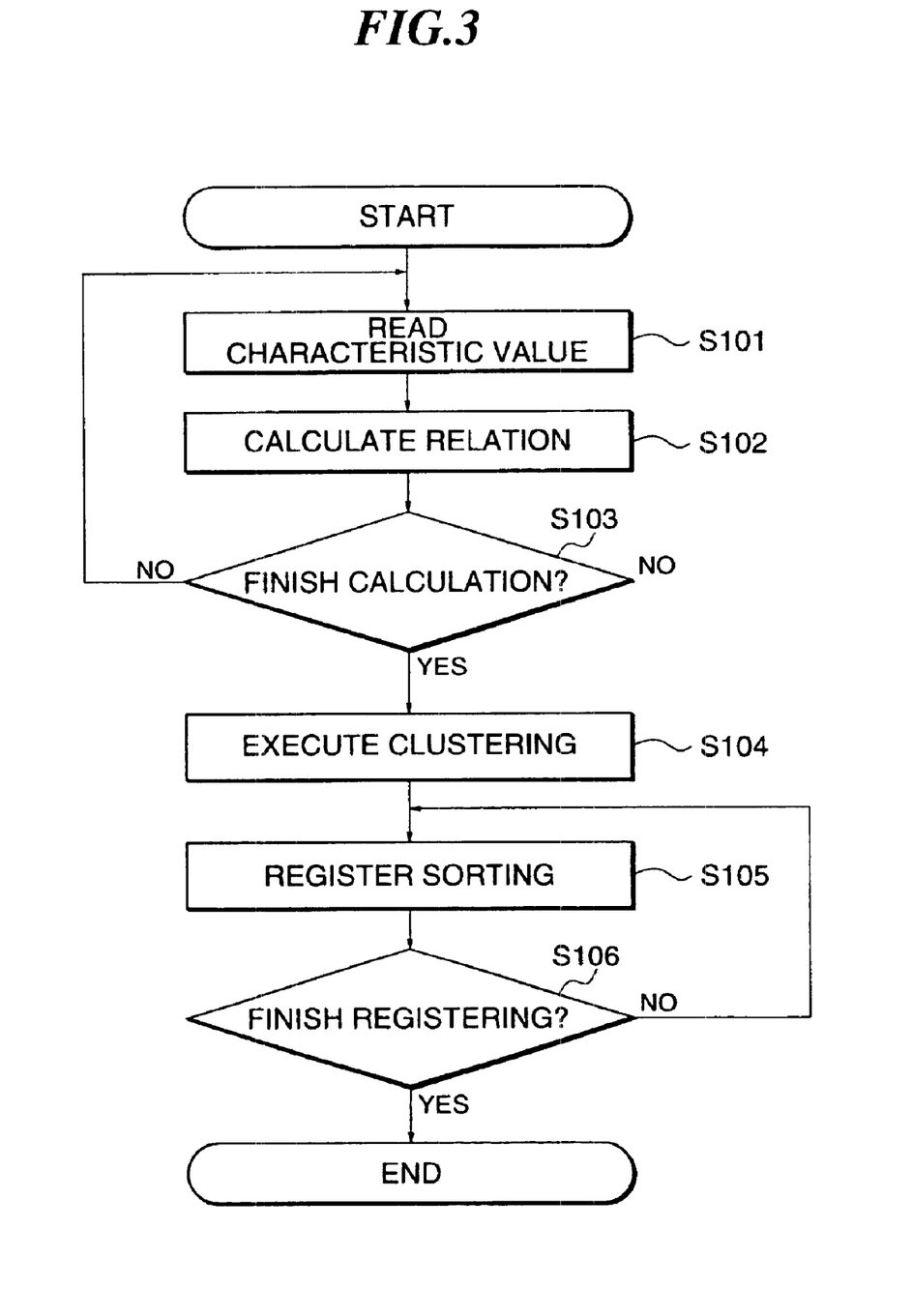
FIG. 3 is a flowchart illustrating a schematic processing procedure in the first embodiment of the image data sorting method relating to the invention.

Next, the processing operation example in the filing device thus configured, namely, the image data sorting method in this embodiment will be discussed. FIG. 3 is a flowchart illustrating a schematic processing procedure in the first embodiment of the image data sorting method relating to the invention.

In the filing device, plural image data pieces being an object of the clustering are assumed to be inputted to the image input unit 1, which are temporarily memorized by the image memory unit 2 and thereafter stored in the image storage unit 4. Here, these plural image data pieces are memorized and stored in association with the characteristic value vectors extracted by the characteristic value extraction unit 3.

Thus, in the sorting of plural image data pieces stored in the image storage unit 4, the relation evaluation unit 5 reads all of n types of the characteristic value vectors associated with a certain image data piece from the image storage unit 4 (step 101, hereunder the step is abbreviated by 'S'). And, the relation between the characteristic value vector read out and the other characteristic value vectors stored in the image storage unit 4 is acquired (S102). Here, the relation evaluation unit 5 evaluates that, when the sum of the distance between the characteristic value vectors and the angle between the same is small, the relation between them is great. The above processing is executed to all of the image data pieces stored in the image storage unit 4 and the characteristic value vectors associated with the concerned image data pieces (S103).

As the relation evaluation unit 5 evaluates the relation between the image data pieces stored in the image storage unit 4, next in the filing device, the clustering unit 6 executes clustering based on the evaluation result (S104). Here, the clustering unit 6, adopting a clustering technique among predefined ones, for example, the merge-join method, executes clustering, which includes the determination of the number of the clusters. This clustering by the clustering unit 6 divides the events into several clusters, which are expressed each by the characteristic value vectors associated with the plural image data pieces in the image storage unit 4, and groups the clusters so that the relation between the characteristic value vectors in each cluster becomes higher and the relation between the different clusters becomes lower.

As the clustering unit 6 executes the clustering, next in the filing device, the sorting register unit 7 executes, on the basis of the clustering result, sorting of the plural image data pieces stored in the image storage unit 4, and registers the sorting result in the image storage unit 4 (S105). Concretely, the sorting register unit 7 registers, in the image storage unit 4, image data groups belonging to each of the clusters acquired through clustering by the clustering unit 6 in association with the attribute information of the image data groups each.

Here, as the attribute information, if attribute information is inputted together with the input of the image data pieces by the image data input unit 1, the inputted attribute information is used. Further, regardless of the presence of the input by the image input unit 1, a sequence of numbers indicating the time when a series of the foregoing processing operations were executed with a specific number indicating each cluster added thereon may be employed. That is, as the attribute information, either one or both of an arbitrary one inputted from the image input unit 1 and a specific one that is predetermined may be used.

In the filing device, the aforementioned processing operations are executed to all the image data pieces stored in the image storage unit 4 and the characteristic value vectors associated with the image data pieces (S106), and the sorting of the image data pieces stored in the image storage unit 4 is executed.

As mentioned above, according to the filing device of this embodiment and the image data sorting method that the filing device executes, since the sorting register unit 7 is designed to execute sorting of the plural image data pieces stored in the image storage unit 4 on the basis of the clustering result by the clustering unit 6, the plural image data pieces which are inputted by the image input unit 1 and stored in the image storage unit 4 are to be automatically sorted into groups in which the data pieces have a higher relation, and to be registered. In other words, since sorting is based on the clustering result, the sorting is automatically executed so that the image data pieces each having a higher relation belong to one cluster, and therefore, no preprocessing for setting external criteria, etc., is required, and the appropriateness of the range of the sorting items can be secured. In addition, since the sorting is based on the result of the clustering executed to the characteristic value vectors of the image data pieces, the result of the sorting will not be dependent on the types of the image data pieces such as document images or natural images, etc.

Further, according to the filing device of this embodiment and the image data sorting method that the filing device executes, the clustering is executed on the basis of the relation between the characteristic value vectors (physical value having a magnitude and a direction) of the image data pieces. Therefore, the characteristics of the image data will precisely be reflected on the sorting result of the image data pieces, which makes it possible to sort independently of the types of the image data pieces and still further enhance the accuracy of the sorting as the result.

However, the characteristic value vector extracted from the image data pieces is not limited to what is expressed by the vector, and any other characteristic value vectors will naturally gain an automatic sorting effect by the clustering. The characteristic value vector may be singular or plural.

Further, according to the filing device of this embodiment, although the clustering is executed by means of any of the clustering methods, none of the methods will require external criteria, and the appropriateness of the range of the sorting items can be secured.

Further, when the clustering unit 6 executes non-hierarchical clustering, the filing device may include, for example, an operation panel that a user operates as a cluster number specifying unit, and may set the number of clusters when executing the non-hierarchical clustering from the cluster number specifying unit. In such a case, since the number of clusters is specified in advance, the clustering will be quickly performed. Furthermore, the intention of a user, for example, can be reflected on the result of the clustering, and the appropriateness of the range of the sorting items will be controlled.

Further, according to the filing device of this embodiment, the image management unit 8 is designed to execute the management to the plural image data pieces stored in the image storage unit 4 on the basis of the sorting result by the sorting register unit 7, which will enhance the appropriateness and the efficiency in the management of image data pieces, etc., and will make the filing device very preferable.

Further, according to the filing device of this embodiment, the image management unit 8 executes the management to the plural image data pieces stored in the image storage unit 4 on the basis of the attribute information of the image data pieces as well, which will achieve still further appropriateness of the management, and will enhance facility of use, because the user can easily understand the contents of the management.

[Second Embodiment]

Next, the second embodiment relating to the filing device with the invention applied and the image sorting method that the filing device executes will be discussed. However, only discriminations from the first embodiment will be described here.

Figure 4:
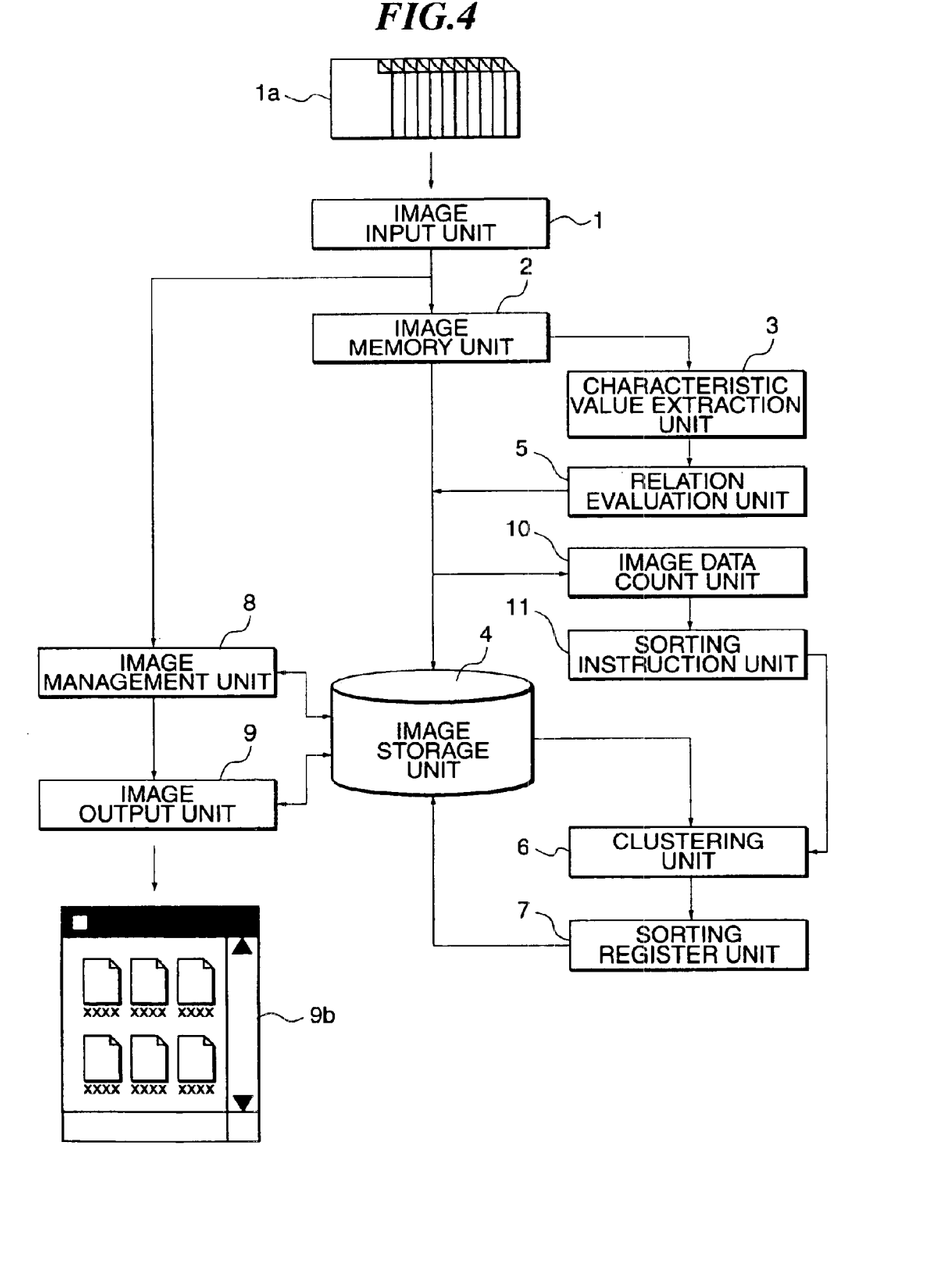
FIG. 4 is a block diagram illustrating a schematic configuration in the second embodiment of the image data sorting device relating to the invention.

First, a schematic configuration of the filing device in this embodiment will be explained. FIG. 4 is a block diagram illustrating a second schematic configuration in which the invention is applied to the filing device. In the drawing, the same components as in the first embodiment are given the same symbols.

As illustrated in FIG. 4, the filing device in this embodiment includes an image data count unit 10, and a sorting instruction unit 11 in addition to the components of the filing device explained in the first embodiment.

The image data count unit 10 is to count the image data pieces accepted by the image input unit 1, which are temporarily stored in the image storage unit 2. The number of the image data pieces that the image data count unit 10 counts may be an accumulative number of the image data pieces, or a number thereof in a certain period of time.

The sorting instruction unit 11 determines whether to or not to execute clustering processing on the basis of the count result of the image data pieces acquired by the image data count unit 10, and instructs the clustering unit 6 to execute the determination result.

The image data count unit 10 and the sorting instruction unit 11 may be realized by a combination of a CPU that executes a specified program and a RAM that functions as a work memory and the like.

Figure 5:
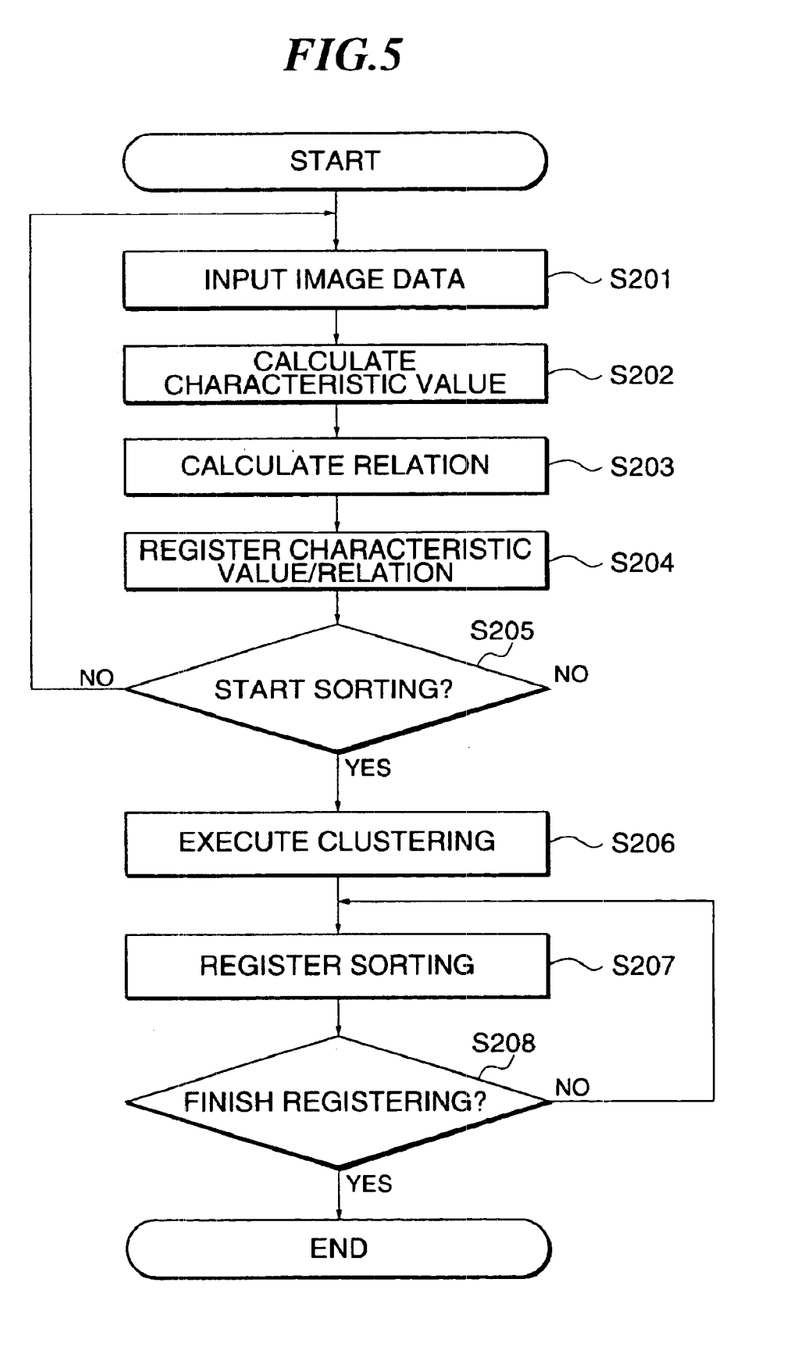
FIG. 5 is a flowchart illustrating a schematic processing procedure in the second embodiment of the image data sorting method relating to the invention.
Figure 6:
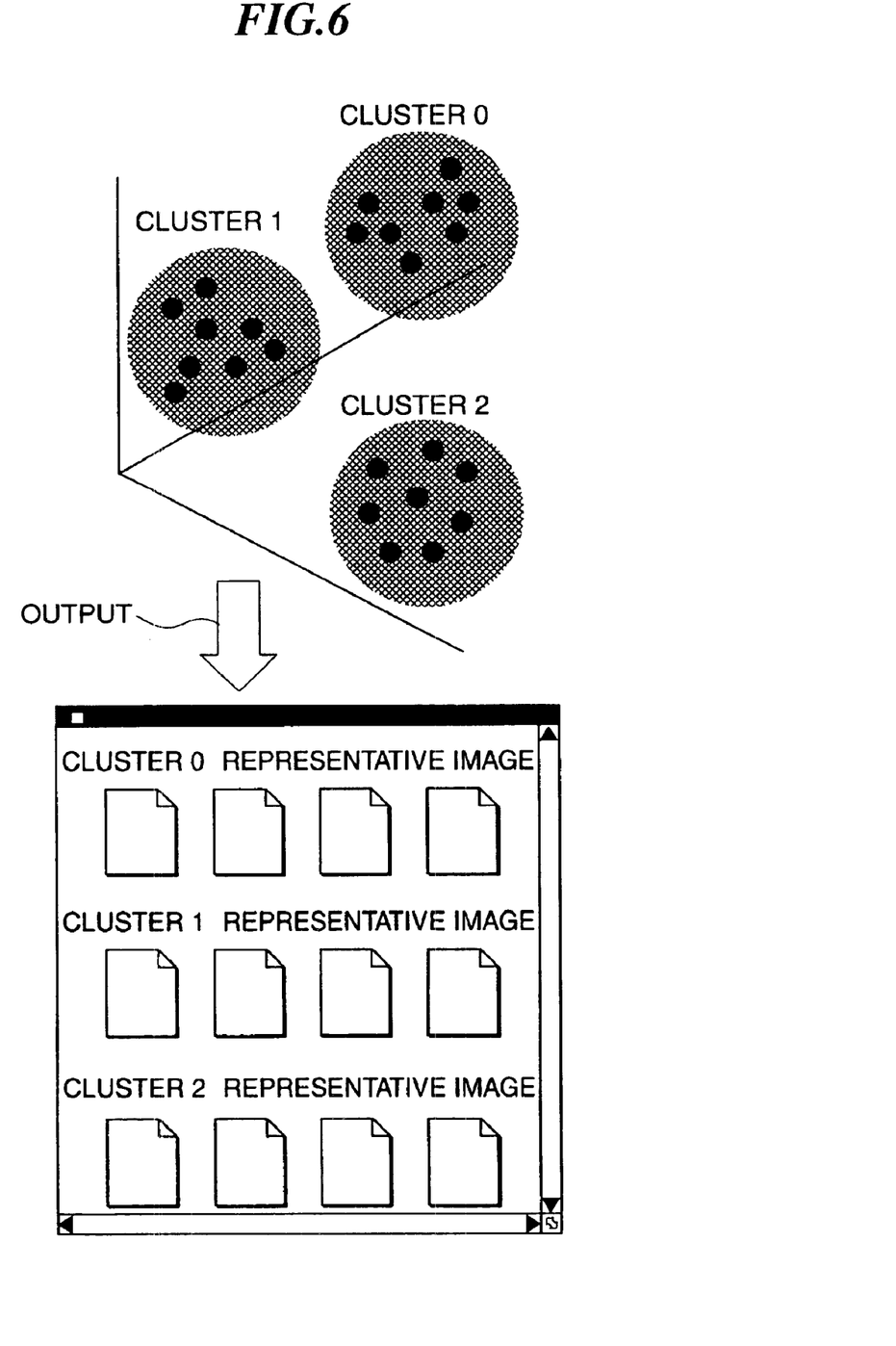
FIG. 6 is a conceptual illustration explaining an output as the sorting result in the second embodiment of the invention.

Next, the processing operation example in the filing device thus configured, namely, the image data sorting method in this embodiment will be described. FIG. 5 is a flowchart illustrating a schematic processing procedure in the second embodiment of the image data sorting method relating to the invention, and FIG. 6 is a conceptual illustration explaining an output as the sorting result in the second embodiment.

In the filing device, it is assumed that part of plural image data pieces being an object of the clustering are inputted to the image input unit 1, and are stored already in the image storage unit 4 in association with the characteristic value vectors extracted by the characteristic value extraction unit 3.

Further, it is assumed that clustering by the clustering unit 6 and sorting by the sorting register unit 7 are already executed to the image data pieces stored in the image storage unit 4. The clustering and the sorting of the image data pieces stored in the image storage unit 4 are considered to be executed at a timing when the image data storage unit 4 stores a specific number of image data pieces. Or, regardless of the number of the image data pieces, the clustering and the sorting may be executed at every specific time. The timing of executing the clustering and the sorting of the image data pieces is instructed by the sorting instruction unit 11, as will be described later.

Thereafter, as shown in FIG. 5, if a new image data piece is inputted to the image input unit 1 (S201), in the filing device, after the image storage unit 2 executes the temporary storage, the characteristic value extraction unit 3 extracts the characteristic value vector of the new image data piece (S202). Further, the relation evaluation unit 5 acquires the relation between the characteristic value vector of the new image data piece and the characteristic value vector associated with the image data pieces already stored in the image storage unit 4 (S203). And, the new image data piece and the characteristic value vector acquired from the image data piece are registered in the image storage unit 4, while the relation with the image data pieces already stored is maintained (S204).

In other words, when a new image data piece is inputted, on the basis of the result of clustering and sorting already executed to the image data stored in the image storage unit 4, the clustering unit 6 and the sorting register unit 7 sorts the new image data piece so that the new image data piece belongs to the cluster having the highest relation among the existing clusters.

When sorting the new image data piece, the clustering unit 6 and the sorting register unit 7 are needed to specify the cluster having the highest relation on the basis of the relation with the characteristic value vector acquired from the center of gravity of the existing clusters. Apart from this, it is conceivable to specify the cluster having the highest relation on the basis of the center value of the relation between the characteristic value vector of the new image data piece and the characteristic value vector of each of the image data pieces stored in the image storage unit 4.

However, the foregoing sorting of a new image data pieces based on the existing clusters will decrease the appropriateness of the existing clusters, namely, the already exiting sorting items accompanied with the increase of the number of image data pieces newly stored in the image storage unit 4, and will consequently increase the possibility to make the sorting of the new image data pieces inappropriate.

Providing for this possibility, the filing device includes the sorting instruction unit 11, and when the sorting instruction unit 11 issues an instruction to execute clustering (S205), the filing device destroys the existing sorting in regard to the image data pieces stored in the image storage unit 4. And, the clustering unit 6 and the sorting register unit 7 newly execute clustering and sorting of all of the image data pieces stored in the image storage unit 4, in the same manner as in the first embodiment (S206 to S208).

Here, it is conceivable that the sorting instruction unit 11 gives an instruction to execute the clustering to the clustering unit 6 at the following timing. That is, when there is an input of a new image data piece to be stored in the image storage unit 4, since the image data count unit 10 counts this, at the time when the count reaches a specific number, the sorting instruction unit 11 gives the instruction to execute clustering to the clustering unit 6. Apart from this, regardless of the number of the new image data pieces, the sorting instruction unit 11 may be designed to give an instruction to the clustering unit 6 at every specific time.

When the sorting is executed to all of the image data pieces stored in the image storage unit 4 in the filing device, the image output unit 9 outputs the result of the sorting in accordance with the instruction from the image management unit 8.

As shown in FIG. 6, the image output unit 9 outputs an image data piece located near the center of each cluster, as a representative image that expresses the character of each cluster properly. Thereby, the character of each cluster, that is, the sorting result of the image data piece by the clustering is clarified. However, in order to clarify the extension of each cluster, the image output unit 9 may be designed to output image data pieces having a high relation with the image data pieces located near the center of each cluster on a list.

The image output unit 9 outputs the sorting result at the moment when sorting of the image data pieces is completed, or at the moment when the resorting after destruction of the existing sorting is completed, or at the timing that a user designates.

As mentioned above, in the filing device of this embodiment and the image data sorting method that the filing device executes, in the same manner as in the first embodiment, since the sorting register unit 7 executes sorting of the plural image data pieces stored in the image storage unit 4 on the basis of the clustering result by the clustering unit 6, the appropriateness of the range of the sorting items (grouping) can be secured without needing external criteria, etc., and further the sorting can be carried out independently of the types of the image data pieces such as document images or natural images, etc.

Further, according to the filing device of this embodiment, clustering by the clustering unit 6 and sorting by the sorting register unit 7 are designed to be executed at a specific timing in accordance with the instruction from the sorting instruction unit 11. That is, since the image data pieces stored in the image storage unit 4 are automatically sorted at a specific timing, there is not a possibility that sorting is not executed for a long time, and the appropriateness regarding the sorting of the image data pieces stored in the image storage unit 4 will be achieved in consideration for the balance with the processing load of the clustering and the sorting.

Further, according to the filing device of this embodiment, if there is a new image data piece to be stored in the image storage unit 4, the image data pieces stored in the image storage unit 4 with the new image data piece included are to be automatically sorted. Therefore, if there is a new image data piece to be added, the appropriateness regarding the sorting of the image data pieces stored in the image storage unit 4 will be achieved, and the filing device of this embodiment will make a very preferable filing device that needs to store the image data pieces sequentially.

Especially in the filing device of this embodiment, if there are existing clusters, the clustering unit 6 and the sorting unit 7 will execute the resorting of the image data pieces at a specific timing. Accordingly, the filing device of this embodiment is able to avoid the occurrence that the appropriateness of the already exiting sorting items is deteriorated accompanied with the increase of the number of image data pieces stored in the image storage unit 4, and to prevent the possibility that the sorting of the image data pieces will become inappropriate in consequence.

Further, according to the filing device of this embodiment, the image output unit 9 outputs the image data piece located near the center of each cluster by way of illustration, or outputs the image data pieces having a high relation with the image data piece located near the center of each cluster. Accordingly, a reference to the contents of the output will clarify the characteristic point of each cluster, the extension of each cluster, and the image data piece belonging to each cluster, etc., which will provide a user with an extremely high utility.

However, the filing device may be configured such that it is provided with, for example, an operation panel that a user operates as an output designation unit, and the output designation unit designates the cluster that the image output unit 9 outputs. In such a case, since the image data piece located near the center of the cluster relating to the designation, or the image data pieces having a high relation with the foregoing image data piece are outputted from the image output unit 9, the intentions of a user can be reflected on the contents of the output, which still more enhances usefulness for the user.

Further, in the description of the first and second embodiments, the invention is applied to the filing device of image data pieces. However, the invention is not limited to this, and naturally the invention can be applied even to the other device, as long as it handles image data pieces, for example, a database server.

As having been described, according to the image data sorting device and the image data sorting method of this invention, since the sorting of the plural image data pieces is executed on the basis of the result of clustering, these plural image data pieces are automatically sorted into groups, in each of which the image data pieces have a higher relation. In other words, since the sorting is based on the clustering result, any preprocessing for setting external criteria, etc., are not required, and the appropriateness of the range of the sorting items (grouping) can be secured. In addition, since the sorting is based on the events expressed by the characteristic values of the image data pieces, the sorting of image data pieces can be carried out independently of the types of the image data pieces such as document images or natural images, etc.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The entire disclosure of Japanese Patent Application No. 2000-141828 filed on May 15, 2000 including specification, claims, drawings, summary and abstract is incorporated herein by reference in its entirety.

What is claimed is:

1. An image data sorting device comprising:
   a characteristic value extraction unit that extracts characteristic values of an image data piece from image data pieces,
   wherein the image data piece is converted into a color space L*a*b and thereafter characteristic values are extracted,
      wherein extracted characteristic values are expressed in Ij dimensional vector (j=1, 2, ..., n, here $1 \leq Ij$, $1 \leq n$) in which n types of characteristic value vectors are obtained;
   a relation evaluation unit that evaluates a mutual relation between the characteristic value vectors that the characteristic value extraction unit extracts from plural image data pieces;
   a clustering unit that executes clustering to events expressed by the characteristic value vectors of the plural image data pieces on the basis of an evaluation result of the relation acquired by the relation evaluation unit; and
   a sorting register unit that automatically sorts the plural image data pieces on the basis of a result of clustering by the clustering unit.

2. An image data sorting device according to claim 1, wherein:
   the characteristic extraction unit extracts the n types of characteristic value vectors as the characteristic value of the image data piece; and
   the relation evaluation unit, synthesizing the n types of characteristic value vectors to each of the n types of characteristic value vectors that the characteristic value extraction unit extracts from the plural image data pieces, evaluates the relation between the image data pieces based on synthesis result.

3. An image data sorting device according to claim 1, wherein the clustering unit executes clustering by means of a non-hierarchical method based on a cluster number.

4. An image data sorting device according to claim 1, wherein the clustering unit executes by means of a hierarchical method that joins clusters on the basis of the relation between the clusters.

5. An image data sorting device according to claim 1, wherein the clustering unit executes clustering by means of a fuzzy technique that employs a fuzzy theory.

6. An image data sorting device according to claim 1, wherein the clustering unit executes clustering by means of a crisp technique that does not employ a fuzzy theory.

7. An image data sorting device according to claim 1, wherein the clustering unit includes a cluster number specifying unit that specifies a cluster number when executing clustering.

8. An image data sorting device according to claim 1, further comprising:
   an image storage unit that stores plural image data pieces; and
   an image management unit that manages the plural image data pieces stored in the image storage unit on the basis of a sorting result by the sorting register unit.

9. An image data sorting device according to claim 8, wherein the image management unit manages the plural image data pieces stored in the image storage unit on the basis of the sorting result by the sorting register unit and attribute information relating to the image data pieces, which are given to the plural image data pieces.

10. An image data sorting device according to claim 8, wherein, when the image storage unit stores a specific number of image data pieces, the clustering unit and the sorting register unit execute clustering and sorting of the image data pieces stored in the image storage unit.

11. An image data sorting device according to claim 8, wherein the clustering unit and the sorting register unit execute clustering and sorting of the image data pieces stored in the image storage unit each time a specific period of time passes.

12. An image data sorting device according to claim 8, wherein, when there is a new image data piece to be stored in the image storage unit after clustering and sorting of the image data pieces stored in the image storage unit, the clustering unit and the sorting register unit execute sorting of the new image data pieces in such a manner that the new image data piece belongs to a cluster having the highest relation among existing clusters relating to the image data pieces stored in the image storage unit.

13. An image data sorting device according to claim 12, wherein the clustering unit and the sorting register unit execute sorting of the new image data piece on the basis of the relation with the characteristic value acquired from the center of gravity of the existing clusters relating to the image data pieces stored in the image storage unit.

14. An image data sorting device according to claim 12, wherein the clustering unit and the sorting register unit execute sorting of the new image data piece on the basis of a center value of the relations between the characteristic value of the new image data piece and the characteristic values of the image data pieces each stored in the image storage unit.

15. An image data sorting device according to claim 8, wherein, when more than a specific number of image data pieces are added in the image storage unit after sorting by the sorting register unit, the clustering unit and the sorting register unit destroy the existing sorting and execute clustering and sorting of all of the image data pieces stored in the image storage unit.

16. An image data sorting device according to claim 8, wherein, when a specific time passes after sorting by the sorting register unit, the clustering unit and the sorting register unit destroy the existing sorting and execute clustering and sorting of all of the image data pieces stored in the image storage unit.

17. An image data sorting device according to claim 1, further comprising an image output unit that outputs image data pieces located near the center of each cluster, upon completion of clustering by the clustering unit and sorting by the sorting register unit.

18. An image data sorting device according to claim 1, further comprising an image output unit that outputs image data pieces having a high relation with image data pieces located near the center of each cluster, upon completion of clustering by the clustering unit and sorting by the sorting register unit.

19. An image data sorting device according to claim 17, wherein the image output unit outputs only the image data pieces relating to a designated cluster.

20. An image data sorting device according to claim 17, wherein, after clustering by the clustering unit and sorting by the sorting register unit have been executed, when clustering by the clustering unit and sorting by the sorting register unit are executed again, the image output unit again outputs image data pieces after being sorted again.

21. An image data sorting method comprising the steps of:

extracting characteristic values of an image data piece from image data pieces, wherein, the image data piece is converted into a color space $L*a*b$ and thereafter characteristic values are extracted, wherein extracted characteristic values are expressed in Ij dimensional vector (j=1, 2, ..., n, here $1 \leq Ij$, $1 \leq n$) in which n types of characteristic value vectors are obtained;

evaluating a mutual relation between each of the n types of characteristic value vectors;

executing clustering to events expressed by the n types of characteristic value vectors of the plural image data pieces on the basis of an evaluation result of the relation; and automatically sorting the plural image data pieces on the basis of a result of the clustering.

22. An image data sorting method comprising the steps of:

extracting n types of characteristic value vectors, wherein an image data piece is converted into a color space $L*a*b$ and thereafter characteristic values are extracted, are expressed by an Ij dimensional vector (j=1, 2, ..., n, here $1 \leq Ij$, $1 \leq n$) from image data pieces;

synthesizing the n types of characteristic value vectors to each of the n types of characteristic value vectors, and evaluating a mutual relation between the image data pieces based on synthesis result;

executing clustering to the characteristic value vectors of the plural image data pieces in accordance with an evaluation result of the relation; and automatically sorting the plural image data pieces on the basis of a result of the clustering.

* * * * *